US 6,733,091 B2

(12) United States Patent
Deland et al.

(10) Patent No.: US 6,733,091 B2
(45) Date of Patent: May 11, 2004

(54) VARIABLE PITCH TRACK

(75) Inventors: André Deland, Drummondville (CA); Yves St-Pierre, Québec (CA)

(73) Assignee: Soucy International Inc., Drummondville (CA)

( * ) Notice: Subject to any disclaimer, the term of this patent is extended or adjusted under 35 U.S.C. 154(b) by 0 days.

(21) Appl. No.: 10/141,603

(22) Filed: May 9, 2002

(65) Prior Publication Data

US 2003/0209942 A1 Nov. 13, 2003

(51) Int. Cl.$^7$ .............................................. B62D 55/24
(52) U.S. Cl. ...................................................... 305/178
(58) Field of Search ................................ 305/160, 165, 305/178, 180, 169, 195, 107, 111, 115

(56) References Cited

U.S. PATENT DOCUMENTS

| | | | | |
|---|---|---|---|---|
| 2,050,845 A | * | 8/1936 | Jett ............................. | 305/115 |
| 3,118,709 A | * | 1/1964 | Case | |
| 3,948,110 A | * | 4/1976 | Lassanske ................... | 305/178 |
| 4,278,302 A | | 7/1981 | Westimayer et al. | |
| 5,709,440 A | * | 1/1998 | Lecours ....................... | 305/178 |
| 5,713,645 A | * | 2/1998 | Thompson et al. ......... | 305/168 |
| D436,892 S | | 1/2001 | Soucy et al. | |
| 6,296,329 B1 | * | 10/2001 | Rodgers et al. ............. | 305/165 |
| 6,402,268 B1 | * | 6/2002 | Lussier ........................ | 305/165 |

FOREIGN PATENT DOCUMENTS

JP           54-44575      *  3/1982

* cited by examiner

*Primary Examiner*—Russell D. Stormer
(74) *Attorney, Agent, or Firm*—Robert Brouilette; Gaétan Prince; Ronald S. Kosie

(57) ABSTRACT

The endless track is made of a reinforced rubber material with longitudinally spaced and transversely disposed ridges or lugs. It is particularly well-adapted for recreational snowmobiles having a single track. The ground-engaging side of the track features a tread pattern that is repeated uniformly or not over the entire length of the track. The tread pattern comprises a plurality of projecting traction lugs each having an upper edge. The internal side of the track features a plurality of protuberances called drive lugs which engage in the sprockets. These sprockets are driven by the snowmobile engine and transmit its power to the endless track. The braking power is also transmitted by the sprockets to the track. It is characterized in that the drive lugs have a pitch distance half of the pitch distance of the tread pattern therefore doubling the number of lugs engaged in the sprocket. Such tracks reduce noise and rolling resistance.

4 Claims, 2 Drawing Sheets

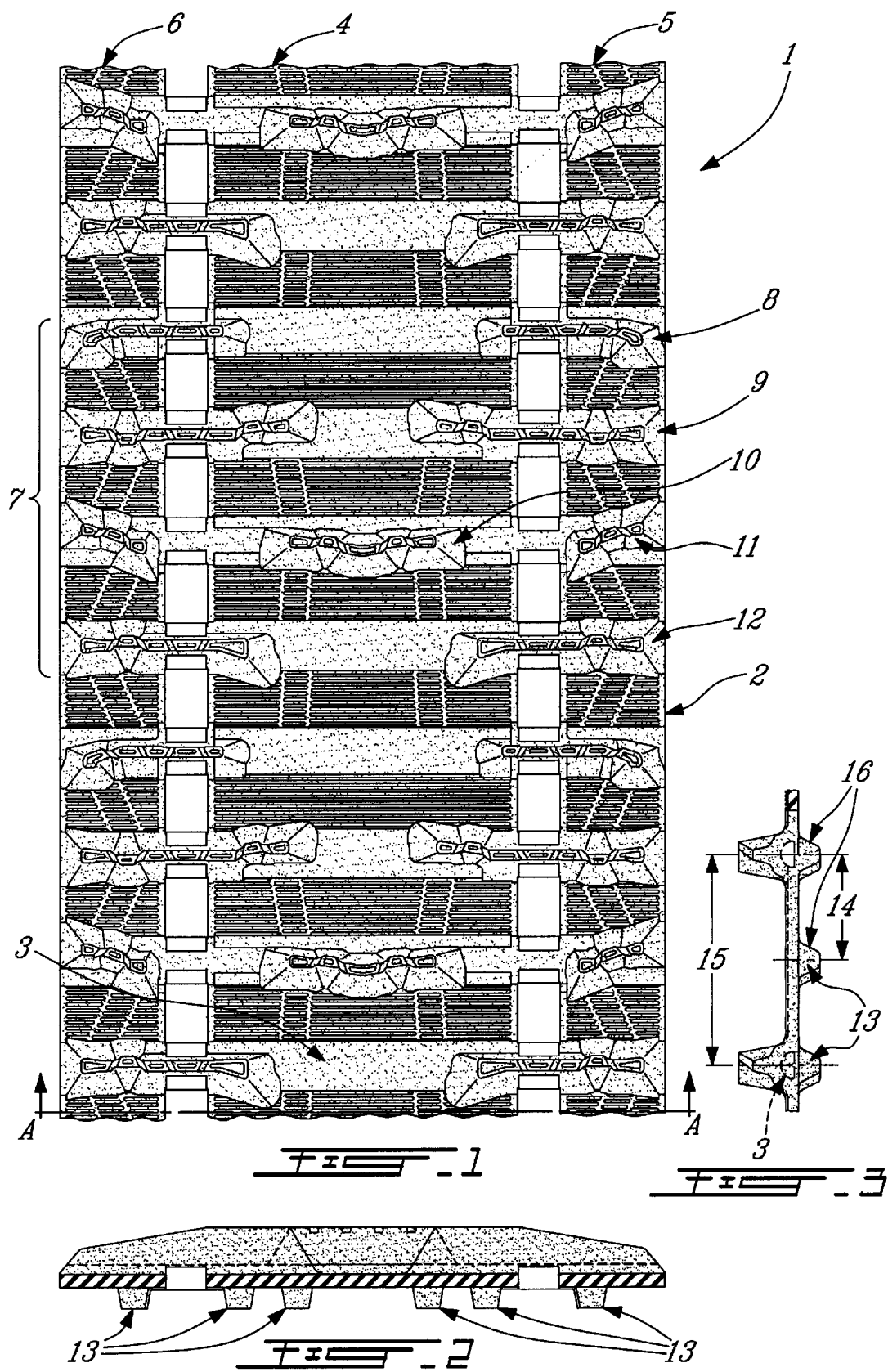

VARIABLE PITCH TRACK

FIELD OF THE INVENTION

This invention relates to an endless track which is made of a reinforced rubber material with tread patterns having a first pitch and with longitudinally spaced and transversely disposed drive lugs, having a second pitch, different from the first pitch.

DESCRIPTION OF RELATED ART

In the snowmobile industry, it has been a standard practice to have the drive lugs located exactly under the tread lug (traction lugs) which are both aligned with a composite stiffener which is used to reinforced the track. See for example U.S. Design Pat. No. 436,892 (Soucy & al). This arrangement of tread lug and composite stiffener give the drive lug enough strength to transmit power to the endless track. This leads to a number of drawbacks. One of them is that the drive lug pitch is driven by the outer tread pitch. Therefore, one has to compromise when designing a track since both elements accomplish different duties. The tread lugs cannot be too close together since the traction in snow would be reduced. After many years of development, the standard pitch in a snowmobile track has been set to the present 2.52 inches. At this pitch, although very functional, the noise and rolling resistance generated by the drive lugs are not optimized.

Environmental issues are a big concern in the snowmobile industry and reducing noise and rolling resistance is highly desirable for the comfort of the driver and of the people who are present near areas of snowmobile travel. The lowering of rolling resistance also lowers fuel consumption with the resulting lowering of combustion emissions.

SUMMARY OF THE INVENTION

One aspect of the present invention is to reduce substantially the noise generated from the endless track at all speeds and reduce rolling resistance (and thus fuel consumption) at low to medium speeds (0–70 mph) by having a drive lug pitch different than the tread pitch. It has been found that using a pitch exactly half the pitch of the tread is the best combination for overall snowmobile performance. Using this pitch length, the number of teeth engaged in the sprocket is doubled which reduces the unit impact force at engagement. On a test bench with that configuration, the noise reduction was between 1 to 5 dBa.

There is provided an endless track for a vehicle, the track having an endless body extending along a longitudinal axis and made of reinforced material, the body having a ground engaging outer side and an internal side, the ground-engaging outer side having a tread pattern over the entire length of the track and having a predetermined tread pitch length, the internal side provided with drive lugs repeated over the entire length of the track and having a predetermined drive pitch length, each drive lug having an engaging face laterally extending at an angle which is greater than 90° or lesser than 90° with respect to said longitudinal axis, wherein the drive pitch length differs from the tread pitch length.

These and other aspects and advantages of the present invention are described in or apparent from the following detailed description of a preferred embodiment mad in conjunction with the appended figures.

BRIEF DESCRIPTION OF THE DRAWING

FIG. 1 is a plan view of an example of a track according to a preferred embodiment of the present invention.

FIG. 2 is a transversal cross-sectional view taken from line A—A in FIG. 1.

FIG. 3 is a cross-sectional view of a track according to a preferred embodiment of the present invention.

DESCRIPTION OF A PREFERRED EMBODIMENT

Figure 4:
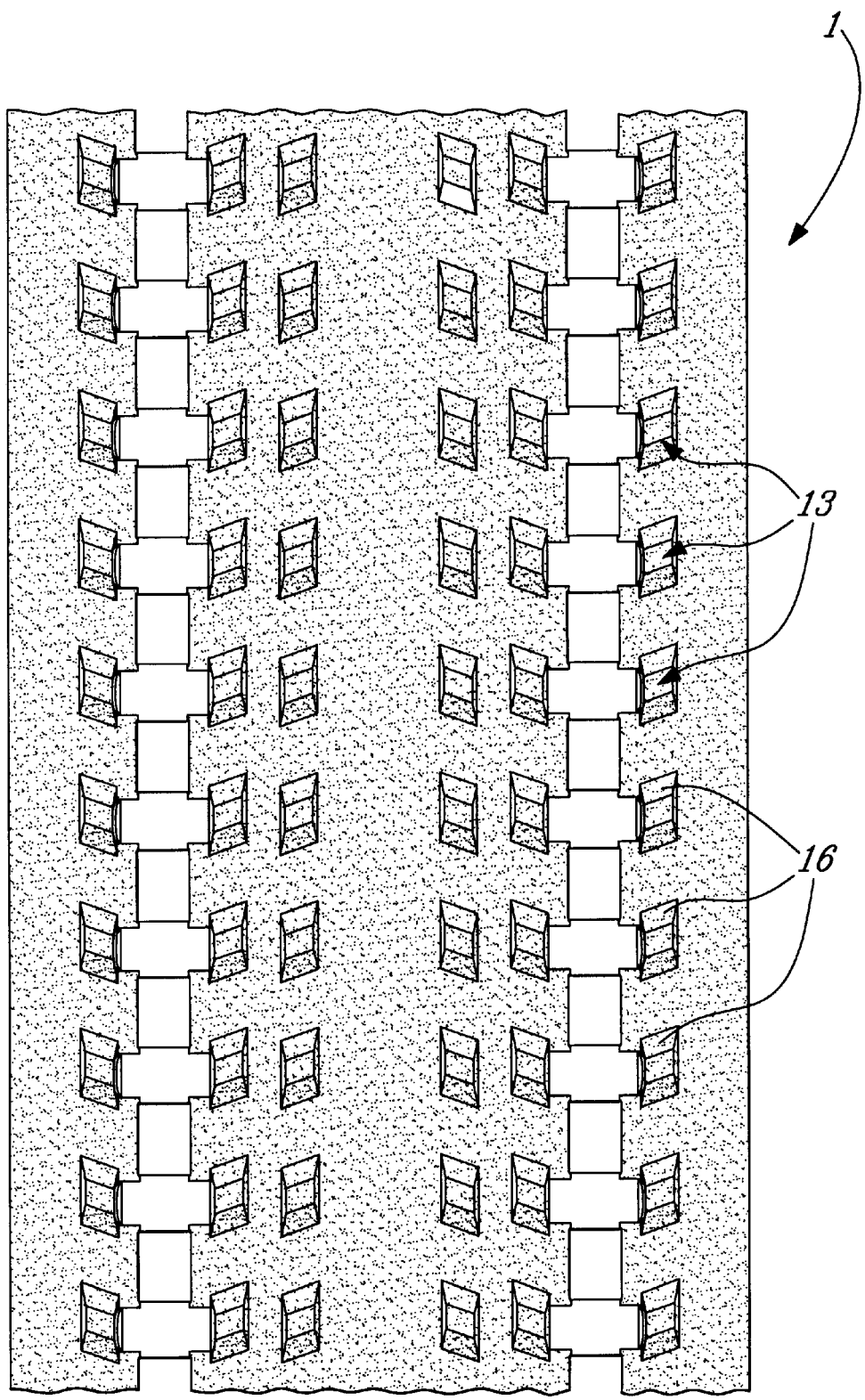
FIG. 4 is a plan view showing the inner side of the track shown in FIG. 1.

A track (1) according to a possible and preferred embodiment of the present invention is described hereinafter and illustrated in the appended figures.

As shown in FIGS. 1 and 2, the track comprises an endless body (2) made of a reinforced rubber material with longitudinally spaced and transversely disposed stiffeners (3) which may or may not be embedded in the rubber material. The body defines a longitudinally extending central portion (4) and a pair of opposite lateral band portions (5, 6) each of which is located on one side of the central portion (4).

The body (2) of the track (1) has a ground-engaging outer side that is provided with that tread pattern (7). The tread pattern (7) is repeated uniformly or not over the entire length of the track (1). The tread pattern (7) comprises a plurality of projecting traction lugs (8, 9, 10, 11, 12) disposed on the central band portion (4), on the lateral band portions (5, 6) or both. The traction lugs typically have between ¾ and 3 inches in height.

The body (2) of the track (1) has an inner side that is provided with drive lugs (13). The drive lugs (13) are repeated uniformly over the entire length of the track (1). As seen in FIG. 3, the drive lug pitch (14) is different than the tread pitch (15) and preferably, the ratio drive lug pitch/tread pitch=0.5.

The number of drive lugs (13) along the width of the track (1) may vary depending on machine weight and power. Typically, the drive lug engaging faces (16) extend laterally in a direction perpendicular to the longitudinal axis of the track but preferably, as illustrated in FIG. 4, extend laterally in a direction which is angled, or not perpendicular, with respect to the longitudinal axis of the track, in order to increase contact area with the sprocket and improve noise reduction.

The drive lug's height is as high as sprocket engagement permits to prevent drive lug skipping while accelerating or braking.

It is, of course, understood that the invention is not to be limited to the exact details of the representative track set forth above. A variety of departures from the foregoing disclosure may be made in order to conform to the design preferences or the requirements of each specific application of the invention. It is therefore appropriate that the invention be construed broadly and in a manner of consistent with the fair meaning or proper scope of the claims that follow.

What is claimed is:

1. An endless track for a vehicle, the track having an endless body extending along a longitudinal axis and made of reinforced material, the body having a ground engaging outer side and an internal side, the ground-engaging outer side having a tread pattern over the entire length of the track and having a predetermined tread pitch length, the internal side provided with drive lugs repeated over the entire length of the track and having a predetermined drive pitch length, each drive lug having an engaging face laterally extending at an angle which is greater than 90° or lesser than 90° with respect to said longitudinal axis, wherein the drive pitch length differs from the tread pitch length.

2. An endless track according to claim 1, characterized in that the drive pitch length is exactly half the tread pitch length.

3. An endless track according to claim 1, characterized in that the vehicle is a snowmobile.

4. An endless track according to claim 2, characterized in that the vehicle is a snowmobile.

\* \* \* \* \*